Nov. 17, 1953            G. H. HERBERT            2,659,345
COMBINATION REST AND FEEDING DEVICE FOR ANIMALS
Filed Oct. 6, 1950                                       2 Sheets-Sheet 1
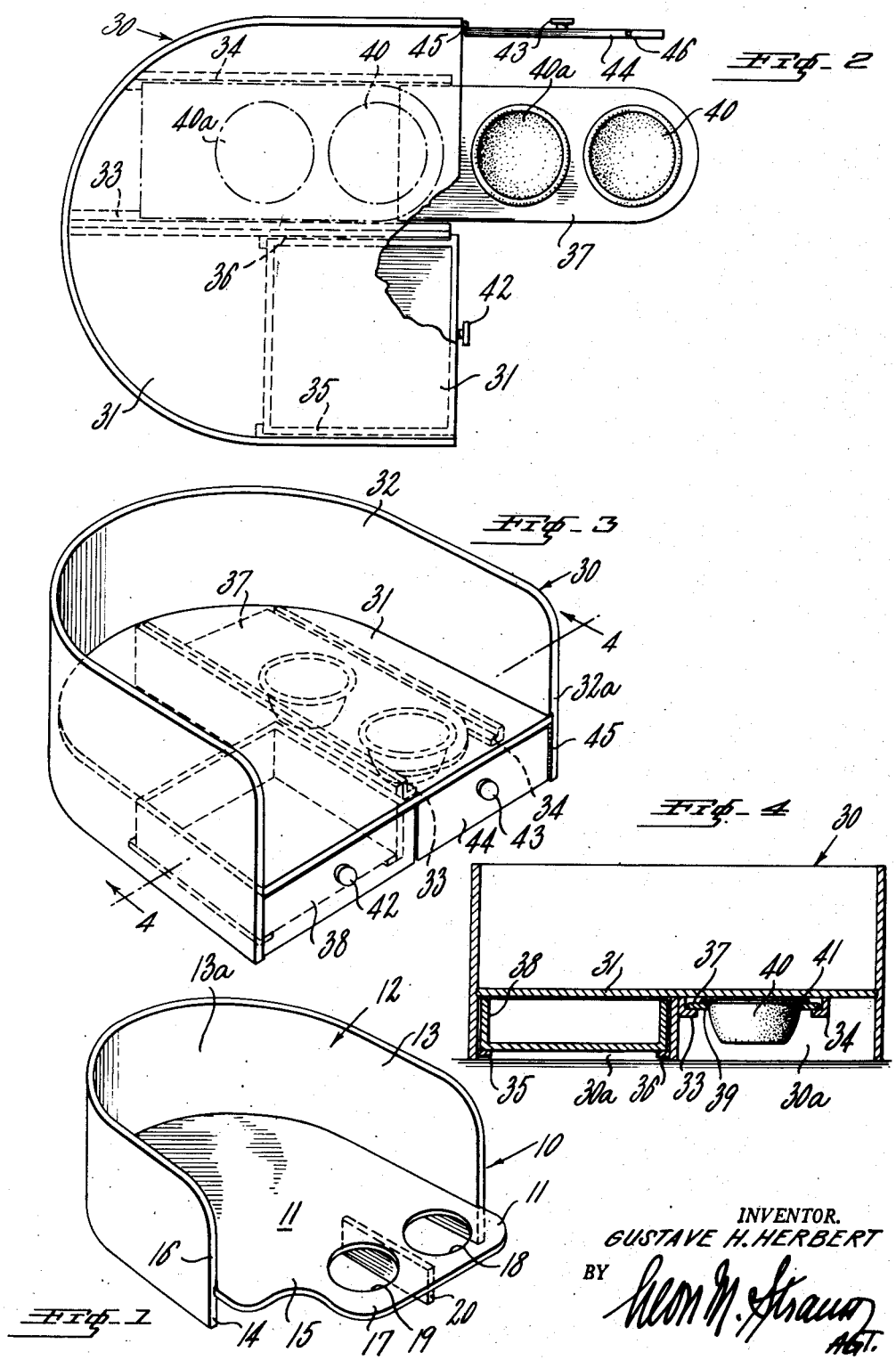
INVENTOR.
GUSTAVE H. HERBERT Nov. 17, 1953  G. H. HERBERT  2,659,345
COMBINATION REST AND FEEDING DEVICE FOR ANIMALS
Filed Oct. 6, 1950  2 Sheets-Sheet 2
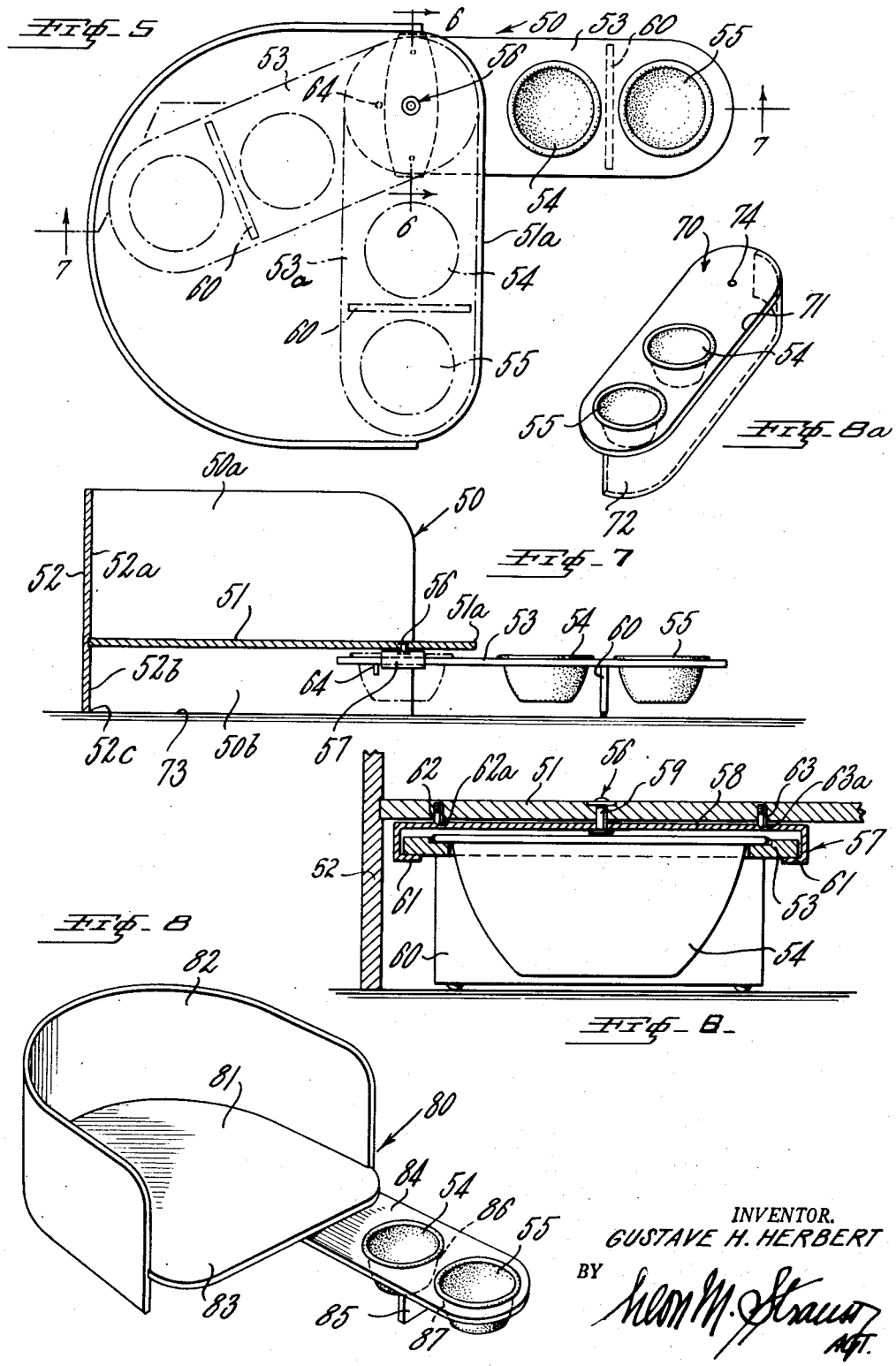
INVENTOR.
GUSTAVE H. HERBERT Patented Nov. 17, 1953

2,659,345

UNITED STATES PATENT OFFICE 2,659,345

COMBINATION REST AND FEEDING DEVICE FOR ANIMALS

Gustave H. Herbert, Bronxville, N. Y.

Application October 6, 1950, Serial No. 188,690

3 Claims. (Cl. 119—15)

This invention relates to a combination rest and feeding device for animals, and in particular for pet animals, such as dogs and cats.

It is one of the objects of the present invention to provide means affording a portable, yet compact, sturdy and effective device of the aforesaid type which may be readily moved from place to place and which is shaped to conform to the particular curvature of the body of an animal in reclining position.

Another object of the present invention is to provide means facilitating the accommodation of food receptacles within the rest structure of the device and the relative positioning of such food receptacles with respect to the device.

Still a further object of the present invention is to provide means ensuring protection of the resting animal against draft and direct contact with the floor on which the rest structure may be placed.

Yet a further object of the present invention is the provision of means contributing to an efficient and practical rest structure or piece of furniture for accommodating pet animals and for holding toys, medicines, brushes and similar articles for use in connection with the grooming and care of animals.

A still further object of the present invention is to provide means connected with the lowermost part of the combination rest and feeding structure to temporarily secure the device in position on a support, such as a floor.

Another object of the invention is to provide means conducive to a simplified combination rest and animal feeding structure whereby the food receiving portion of the structure may be hidden from view and accommodated beneath the rest portion of the structure.

With the above and other objects in view, the invention will be hereinafter more fully described and the combination and arrangement of parts will be shown in the accompanying drawings and pointed out in the claims which form part of the specification.

In the drawings:

Fig. 1 shows a combination rest and feeding structure for animals made in accordance with the invention;

Fig. 2 is a top plan view of the combination rest and feeding structure in modified form, the feeding structure being shown in partly extended position (parts being broken away to expose the interior of the structure);

Fig. 3 is a perspective view of the structure shown in Fig. 2 in closed position, the interior parts of the structure being shown in dotted lines;

Fig. 4 is a cross-sectional view taken along the lines 4—4 of Fig. 3;

Fig. 5 is a view similar to that of Fig. 2 with the feeding structure in modified form;

Fig. 6 is a cross-sectional view taken along the lines 6—6 of Fig. 5;

Fig. 7 is an enlarged cross-sectional view taken along the lines 7—7 of Fig. 5;

Fig. 8 is a perspective view of the structure seen in Fig. 5;

Fig. 8a shows the feeding structure of the device of Fig. 5 in modified form and seen in perspective.

Referring now more specifically to the attached drawings, there is shown in Fig. 1 a combination rest and feeding device, in particular adapted for pet animals. This device 10 consists of a bottom 11 and an upright wall 12 which projects with its portion 13 above bottom 11 and with its portion 14 below bottom 11 so that bottom 11 is raised a predetermined distance above a support such as a floor on which device 10 may be placed. The wall or body 12 is substantially U-shaped in cross-section and includes a pair of spaced side portions interconnected at one end by a curved bight portion. As clearly illustrated the other ends of the side portions terminate in the same plane and define an open front. The portion 13 and the bottom 11 cooperate to define an upper compartment for receiving the animal, while the portion 14 and the bottom 11 cooperate to define a lower compartment for receiving the feeding devices. Bottom 11 has an extension 15 which projects beyond the front edge 16 of wall 12, extension 15 being laterally offset with respect to the plane of symmetry of the body 12 and toward one side portion thereof. Extension 15 includes a platform or board portion 17 reduced in width and provided with spaced openings 18 and 19 for a purpose later to be described. Below board portion 17 there is arranged a short and upright supporting piece 20 which is glued or otherwise attached to the extension 15 with board 17. It is to be noted that wall portion 13 may have a height corresponding approximately to the height of the back of a pet animal, such as a cat, when seated or resting on bottom 11, this wall 13 being accordingly curved at 13a to conform to the natural and curved shape of the back of such animal when in lying condition.

The openings 18 and 19 are adapted to receive bowls for feeding the animal. Such bowls are shown and described in connection with Figs. 2 to 4 inclusive.

As can be seen in Fig. 3, the rest and feeding device 30 embodying the invention in a modified form is provided with a bottom 31 and an upright wall 32 but is otherwise shaped similar to the device illustrated in Fig. 1, with the exception that extension board 17 has been made slideable with respect to the device 30. To this end, there are disposed below the undersurface of bottom 31 of the device 30 a partition, shown in phantom, subdividing the compartment beneath the bottom into channelways in which rails or tracks 33, 34, 35 and 36 are adapted to slideably receive an elongated carrier or table 37 and a drawer 38, respectively. Carrier or board 37 is provided with two suitable and spaced apart openings 39 forming retaining means into which are fitted bowls 40 and 40a, each having a rim 41 for engagement with the top surface of board 37. It can be seen from Fig. 4 that board 37 is slideably supported along tracks 33 and 34 and may be moved therealong from its extended position (as seen in Fig. 2 in full lines) to retracted position which is indicated in dot and dash lines in Fig. 2. As is further evident from Fig. 2, drawer 38 may be moved along ledges or rails 35 and 36 by means of a handle 42 fixed to the forward end of drawer 38. In alignment with handle 42 is another handle 43 forming part of a door 44 which is pivotally and hingedly supported along hinge 45 at the foremost end 32a of wall 32. Thus, when board or platform 37 is moved to retracted position (as seen in Fig. 3) door 44 may be swung from its position as seen in Fig. 2 to closed position in which a spring supported detent 46 retains door 44 in its closed position.

Detent 46 engages for this purpose a suitable recess provided in the undersurface of bottom 31 as is well understood. The bowls 40 and 40a may be made of any suitable material, such as china or plastic material, and when platform 37 is in retracted position an animal resting on bottom 31 will not have access to those bowls unless door 44 is swung to open position and platform 37 is withdrawn from the lower compartment 30a extending below bottom wall 31.

Figs. 5 to 7 show a combination rest and feed structure made in accordance with the invention in a still further modified form. The device 50 comprises as main parts bottom 51 and a curved upright wall 52 having the upper wall portion 52a projecting above bottom wall 51 to form the upper compartment 50a and the lower wall portion 52b extending below bottom wall 51 to form the lower compartment 50b. A suitable platform 53 in which bowls 54 and 55 are recessed in suitable openings of platform 53 is pivotally mounted at 56 by means of a rail support 57. This rail support comprises a wall 58 through which pivot pin 59 extends for connection with the bottom wall 51 in which pin 59 is recessed so as to become substantially flush with the upper surface of bottom wall 51. Since the lower compartment 50b is otherwise hollow, it will be well understood that platform 53 may be swung by means of pivot connection 56 into the lower compartment 50b from its extended position as seen in Figs. 5 and 6. The positioning of the platform 53 within compartment 50b is exemplified in Fig. 5 in dot and dash lines.

As can further be seen from Fig. 7, platform 53 which may be provided at its underface with an upright brace piece 60 is slidably supported on opposite ledges 61 of rail support 57 so that platform 53 may be slidably moved relatively to rail support 57 and bottom wall 51. Platform 53 may be further moved or displaced by means of the pivotally suspended rail support 57 to swing or rotate with respect to bottom wall 51. It is further to be noted that spring-supported detents 62 and 63 retained within the underface of bottom wall 51 will engage suitable recesses 62a and 63a in wall 58 of rail support 57 in predetermined transverse position to bottom wall 51, as indicated at 53a in Fig. 5. As shown in Fig. 6, platform 53 may be provided with a stop 64 to prevent further outerward sliding movement of platform 53 relatively to bottom wall 51 and supporting rail 57. It is well understood that other suitable means may be provided, such as stop or guide means, to ensure adequate functioning of the swingable and slidable platform 53 relatively to the remainder of the structure 50. Fig. 8a shows a platform 70 for receiving bowls 54 and 55 as above disclosed. The front and elongated edge 71 of platform 70 is provided with a skirt 72 the height of which corresponds approximately to the distance of the undersurface of bottom wall 51 and the lowermost edge 52c of upright wall 52 when resting on a floor 73.

Platform 70 is further provided with an opening or hole 74 for the engagement with the pivot arrangement 56 so that platform 70 may be swung about pivot connection 56 to open or extended position (similar to that shown in Fig. 5 with respect to platform 53 and to closed position underneath bottom wall 51 whereby the suitably shaped skirt 72 will extend in alignment with forward edge 51a of bottom wall 51 as may be readily visualized).

Fig. 8 shows a combination rest and feeding device 80 similar to that shown in Fig. 1. This device has the bottom wall 81 and the curved upright wall 82. The bottom wall 81 has the extension 83 at the underface of which is either swingably or fixedly attached platform 84 carrying the supporting piece 85 below it. Platform 84 is provided with spaced openings 86 and 87 to receive bowls 54 and 55 in the manner as above described with respect to Figs. 5 to 7. In contradistinction to the device 50 with movable platform 53 device 80 may have a fixed platform 84 which extends in a direction different from that of platform 17, as seen in Fig. 1.

The combination rest and feeding device may be made from wood, plywood, plastic, plastic composition or any other suitable material and may be equipped with suitably shaped and preferably removable padding (not shown), which is to extend along the bottom or platform and along the curved upright wall.

While some embodiments of the invention have been shown and herein described, it will be understood that further modifications may be made without departure from the general scope and spirit of the invention as defined in the claims.

Having thus described the invention, what is claimed as new and desired to be secured by Letters Patent, is:

1. A combination rest and feeding device for animals comprising an upright body substantially U-shaped in cross-section and curved to conform to the natural shape of an animal when lying therein, said upright body having a lower edge for contact with a support and an open front, a platform spaced above said lower edge and secured within said upright body to define an upper compartment for receiving said animal and a lower compartment, a partition secured within said lower compartment and subdividing the latter into two channelways, means arranged offset with respect to the axis of symmetry of said platform and adapted to be extended beyond said open front and for access by said animal when lying within said upper compartment as well as for access by said animal when standing in front and laterally of said open front, said offset means being constructed for supporting a receptacle for food, means supporting said offset means below and beyond said platform, said offset means including a carrier mounted in one of said channelways for movement of said offset means from a retracted position underlying said platform to an extended position forwardly of said platform and adjacent said open front, and a drawer mounted in the other of said channelways for movement of said drawer from a retracted position wherein said platform forms a cover for said drawer, to an extended position and exteriorly of said body.

2. A combination rest and feeding device according to claim 1, including closure means for bridging one end of one of said channelways and mounted on said body for swinging movement out of the bridging position to facilitate movement of said offset means from said retracted position.

3. A combination rest and feeding device for animals comprising a U-shaped body having vertically extending and spaced apart substantially parallel side portions and a curved bight portion interconnecting said side portions adjacent one end thereof to thereby provide a curved rear wall of said body, the other ends of said side portions terminating in substantially the same plane and defining between them an open front, said body having a lower edge adapted to contact a support, a horizontally disposed platform spaced above said lower edge and secured to said side portions and to said bight portion within said body, the portions of said body above said platform and the latter cooperating to define an upper compartment for receiving said animal, the side portions of said body below said platform and the latter cooperating to define a lower compartment, extension means supported by said platform and arranged for movement below said platform and forwardly with respect to said open front to thereby project therebeyond for access thereto by said animal when lying within said upper compartment as well as for access thereto by said animal when standing in front of said platform, said extension means being provided with at least one aperture for receiving therein a feeding receptacle and positioned forwardly of said platform when said extension means is moved forwardly of said open front, said extension means being laterally offset with respect to the plane of symmetry of said body and being positioned adjacent one side portion of the latter and beyond said open front to thereby facilitate entry of said animal into said upper compartment from a location adjacent the other side portion of said body without substantially interfering with the feeding receptacle when received in said extension means, and means swingably connected to said one side portion for closing said lower compartment and completely covering said extension means with said feeding receptacle when inserted in said extension means upon movement of the latter into said lower compartment and rearwardly with respect to said open front.

GUSTAVE H. HERBERT.

References Cited in the file of this patent

UNITED STATES PATENTS

| Number | Name | Date |
|---|---|---|
| D. 125,280 | Little | Feb. 18, 1941 |
| 229,540 | Maetzel | July 6, 1880 |
| 445,777 | Goodwillie | Feb. 3, 1891 |
| 902,508 | Rathborne | Oct. 27, 1908 |
| 1,333,909 | Firestone | Mar. 16, 1920 |
| 1,869,901 | Le Fever | Aug. 2, 1932 |
| 1,976,234 | Larson | Oct. 9, 1934 |
| 2,016,005 | Giannasca | Oct. 1, 1935 |
| 2,017,265 | Tracy | Oct. 15, 1935 |
| 2,109,267 | Grosser | Feb. 22, 1938 |
| 2,138,560 | Stuart | Nov. 29, 1938 |

FOREIGN PATENTS

| Number | Country | Date |
|---|---|---|
| 21,577 | Great Britain | 1903 |
| 25,144 | Great Britain | Nov. 23, 1908 |
| 7,793 | Great Britain | 1914 |
| 80,537 | Sweden | May 29, 1934 |
| 446,405 | Great Britain | Apr. 29, 1936 |
| 653,123 | Germany | Nov. 15, 1937 |